United States Patent
Parker et al.

(10) Patent No.: US 10,981,656 B2
(45) Date of Patent: Apr. 20, 2021

(54) DEVICE TO ORIENT A RISER OF A PARACHUTE

(71) Applicant: Sun Path Products, Inc., Raeford, NC (US)

(72) Inventors: Thomas Parker, Raeford, NC (US); Jesse Sparling, Raeford, NC (US); Justin Beaurivage, Victoriaville (CA)

(73) Assignee: SUN PATH PRODUCTS, INC., Raeford, NC (US)

( * ) Notice: Subject to any disclaimer, the term of this patent is extended or adjusted under 35 U.S.C. 154(b) by 329 days.

(21) Appl. No.: 16/274,408

(22) Filed: Feb. 13, 2019

(65) Prior Publication Data

US 2020/0255156 A1 Aug. 13, 2020

(51) Int. Cl.
| | |
|---|---|
| *B64D 17/30* | (2006.01) |
| *B64D 17/24* | (2006.01) |
| *B64D 17/34* | (2006.01) |
| *B64D 17/36* | (2006.01) |
| *B64D 17/52* | (2006.01) |

(52) U.S. Cl.
CPC .......... *B64D 17/30* (2013.01); *B64D 17/24* (2013.01); *B64D 17/34* (2013.01); *B64D 17/36* (2013.01); *B64D 17/52* (2013.01)

(58) Field of Classification Search
CPC ........ B64D 17/30; B64D 17/40; B64D 17/24; B64D 17/34; B64D 17/36
See application file for complete search history.

(56) References Cited

U.S. PATENT DOCUMENTS

| | | | | |
|---|---|---|---|---|
| 1,385,773 A | * | 7/1921 | Boland | B64D 17/30 244/151 R |
| 1,560,366 A | * | 11/1925 | Ball | B64D 17/30 244/151 R |
| 1,958,000 A | * | 5/1934 | Hamer | B64D 17/30 244/148 |
| 2,141,041 A | * | 12/1938 | Knight | B64D 17/30 244/151 R |
| 2,594,018 A | * | 4/1952 | Hillesheim | B64D 17/38 244/151 R |
| 2,797,885 A | | 7/1957 | Barish | |
| 3,250,515 A | | 5/1966 | Hudnall et al. | |
| 3,279,012 A | * | 10/1966 | Gold | B64D 17/30 24/200 |
| 4,090,683 A | | 5/1978 | Derrien et al. | |
| 4,279,393 A | | 7/1981 | Spinks | |

(Continued)

FOREIGN PATENT DOCUMENTS

FR 800862 A 7/1936

OTHER PUBLICATIONS

Watch Thy Bridle, "Harness construction", Retrieved from the internet: URL: http://www.watchthybridle.com/2014/08/harness-construction/ [retrieved on Nov. 2, 2018], posted Aug. 24, 2014, pp. 1-7.

*Primary Examiner* — Justin M Benedik
(74) *Attorney, Agent, or Firm* — Coats & Bennett, PLLC (57) ABSTRACT

A device to orient a riser of a parachute. The device can include a twist body that is includes a slot through which the riser passes. The slot includes a twist to change the orientation of the riser from a relatively high-profile orientation to a relatively low-profile orientation. The device can also include a link to connect the riser to the suspension lines on the canopy.

20 Claims, 11 Drawing Sheets

(56) References Cited

U.S. PATENT DOCUMENTS

| | | | | |
|---|---|---|---|---|
| 4,720,064 | A | * | 1/1988 | Herndon ................. B64D 25/06 244/122 AG |
| 5,179,743 | A | * | 1/1993 | Lanman ................ A47C 21/022 24/465 |
| 6,224,019 | B1 | | 5/2001 | Peterson et al. |
| 6,253,874 | B1 | * | 7/2001 | Casebolt ............ A62B 35/0031 182/3 |
| 9,610,917 | B2 | * | 4/2017 | Fleming ................. B60R 22/02 |
| 2016/0097156 | A1 | | 4/2016 | Gallon et al. |

\* cited by examiner

DEVICE TO ORIENT A RISER OF A PARACHUTE

BACKGROUND

A parachute is a device worn by a user that fills with air to allow the user to descend slowly when dropped from an aircraft. The parachute includes a canopy that is usually made of a strong, light-weight fabric such as nylon. Suspension lines are attached to the canopy and spread the weight of the user across the canopy. A harness includes various straps and fittings to be secured to the user. Risers are secured to the harness and attach to the suspension lines at links.

The risers can be constructed from a webbing that includes a relatively large width. During descent, the webbing may cause drag as the relatively large width is exposed in the direction of travel. This drag may reduce performance and/or reduce forward speed.

SUMMARY

One aspect is directed to a device to orient a riser of a parachute. The device includes a twist body with a first side and an opposing second side. A slot with an elongated shape extends through the twist body and includes a first opening at the first side and a second opening at the second side. The slot includes a twist with the first opening being transverse to the second opening.

In another aspect, the device also includes a link with at least a first hole to receive the riser and a second hole that is spaced away from the first hole.

In another aspect, the twist of the slot is 90 degrees.

In another aspect, the slot includes a major axis and the major axis at the first opening is perpendicular to the major axis at the second opening.

In another aspect, the twist of the slot is between 5 degrees and 180 degrees between the first and second sides of the twist body.

In another aspect, the slot includes a width and a length that are each constant between the first opening and the second opening.

In another aspect, the twist of the slot is constant between the first and second sides of the twist body.

In another aspect, a twisted hole extends through the twist body between the first and second sides with a sectional area of the hole being smaller than the slot and with the hole being spaced away from the slot.

In another aspect, the hole is positioned a constant distance away from the slot throughout the twist body between the first and second sides.

In another aspect, at least one of the slot and the hole are contained within a sidewall of the twist body.

One aspect is directed to a device to orient risers of a parachute. The device includes twist bodies positioned along the risers with each of the twist bodies including opposing first and second sides and a slot with a twist between the first and second sides of between 5 degrees and 180 degrees. The twist of each of the twist bodies is configured to rotate the riser between a high profile position at one of the first and second sides and a low profile position at the other of the first and second sides.

In another aspect, the device includes links configured to attach the risers to suspension lines of the parachute with each of the links having a first hole to receive one of the risers and a second hole to receive one or more suspension lines of the parachute.

In another aspect, the twist of each of the twist bodies is equal.

In another aspect, the twist of each of the twist bodies is 90 degrees.

In another aspect, the slot of each of the twist bodies includes a major axis with the major axis at the first side of the twist body being perpendicular to the major axis at the second side of the twist body.

In another aspect, each of the twist bodies further includes a twisted hole that extends through the twist body between the first and second sides with a sectional area of the hole being smaller than the slot and with the hole being spaced away from the slot by a constant distance throughout the twist body.

One aspect is directed to a method of orienting a riser of a parachute. The method includes inserting a riser through a twist body such that the riser has a first orientation between a harness and the twist body with a high profile in a direction of travel and a second orientation between the twist body and a link with a low profile in the direction of travel. The method includes attaching the riser to the link and securing the riser to suspension lines of the parachute.

In another aspect, the method includes rotating the riser between 5 degrees and 180 degrees within the twist body.

In another aspect, the method includes rotating the riser 90 degrees within the twist body.

In another aspect, the method includes inserting the riser through a slot in the twist body.

In another aspect, the method includes inserting a cable through a hole in the twist body.

In another aspect, the method includes orienting a first section of the riser that extends between the twist body and the link with a narrow edge of the riser facing in the direction of travel and orientating a second section of the riser that extends between the twist body and the harness with a wide side of the riser facing in the direction of travel.

One aspect is directed to a device for use with a parachute. The device includes a riser with an elongated shape with a first end and a second end. A link includes opposing first and second sides and sidewalls that extend between the first and second sides. The link includes a slot with an elongated shape that extends through the first and second sides and is sized to receive the riser. The link includes first and second holes that each extend between the first and second sides with the first and second holes configured to receive a connector that attaches to suspension lines of the parachute. The link includes a thickness measured between the first and second sides that is less than a width measured between opposing sidewalls at the slot.

In another aspect, the link includes a flattened shape with the first and second sides being flat.

In another aspect, a straight line extends through a midpoint of each of the slot with the first hole, and the second hole, with the width of the link being greatest at the straight line.

In another aspect, the slot includes a rectangular sectional shape to receive the riser and the second hole comprises a rectangular sectional shape to receive the connector. The first hole includes a non-rectangular sectional shape, with the second hole positioned between the first hole and the slot.

In another aspect, the device includes a twist body with a first side and an opposing second side, and a twisted slot that extends through the twist body and includes a first opening at the first side and a second opening at the second side with the slot including a twist with the first opening being transverse to the second opening.

In another aspect, the twist slot rotates 90 degrees.

In another aspect, the slot includes a major axis that is perpendicular to a centerline of the link.

In another aspect, an input hole in the link extends between the first and second sides with the input hole being laterally offset from each of the slot, the first hole, and the second hole.

One aspect is directed to a device for use with a parachute. The device includes a riser and a link. The link includes a narrow leading edge that extends between opposing first and second sides. The link includes first, second, and third holes that are spaced apart and that extend through the link between the first and second sides with the holes being spaced away from the leading edge. The first, second, and third holes are centered on a straight line that is spaced away from the leading edge and that extends through the link at a maximum width of the link. The riser extends through one of the first, second, and third holes.

In another aspect, an input hole extends through the link between the first and second sides and that is spaced apart from the first, second, and third holes. The input hole is positioned between the leading edge and the straight line.

In another aspect, wherein the third hole includes a rectangular sectional shape configured to receive the riser.

In another aspect, a twist body is positioned along the riser and includes opposing first and second sides and a twist slot with a twist between the first and second sides of between 5 degrees and 180 degrees.

One aspect is directed to a method of attaching a riser to suspension lines of a parachute. The method includes attaching a riser in a slot in a link with the riser extending outward from a bottom of the link with each of the riser and the link being in a low profile orientation with narrow leading edges facing into a direction of travel and wide sides transverse to the direction of travel. The method includes attaching a connector to a first hole in the link with the connector positioned at a top of the link and the connector being secured to the suspension lines of the parachute. The method includes inserting a tail of the connector in a second hole in the link.

In another aspect, the method includes inserting the tail of the connector in the second hole in the link with the second hole positioned directly between the slot and the first hole.

In another aspect, the method includes attaching an input device to an input hole in the link, with the input hole being positioned closer towards a leading edge of the link than the slot.

In another aspect, the method includes attaching each of the riser, the connector, and the end of the connector in a straight line along the link.

In another aspect, the method includes positioning the leading edge of the link directly into the direction of travel.

In another aspect, the method includes positioning a section of the riser that is spaced away from the link in a high profile orientation.

In another aspect, the method includes attaching the riser in the slot in the link and contacting the riser against corners in the slot.

In another aspect, the method includes attaching each of the riser, the connector, and the end of the connector to the link at a widest section of the link.

The various aspects of the various embodiments may be used alone or in any combination, as is desired.

DETAILED DESCRIPTION

The present application is directed to a device to orient a riser of a parachute. The device can include a twist body with a slot to receive the riser. The slot includes a twist to change the orientation of the riser. The device can also include a link to connect the riser to the suspension lines on the canopy. The link can also be used alone without the twist body to connect the riser to the suspension lines.

Figure 1A:
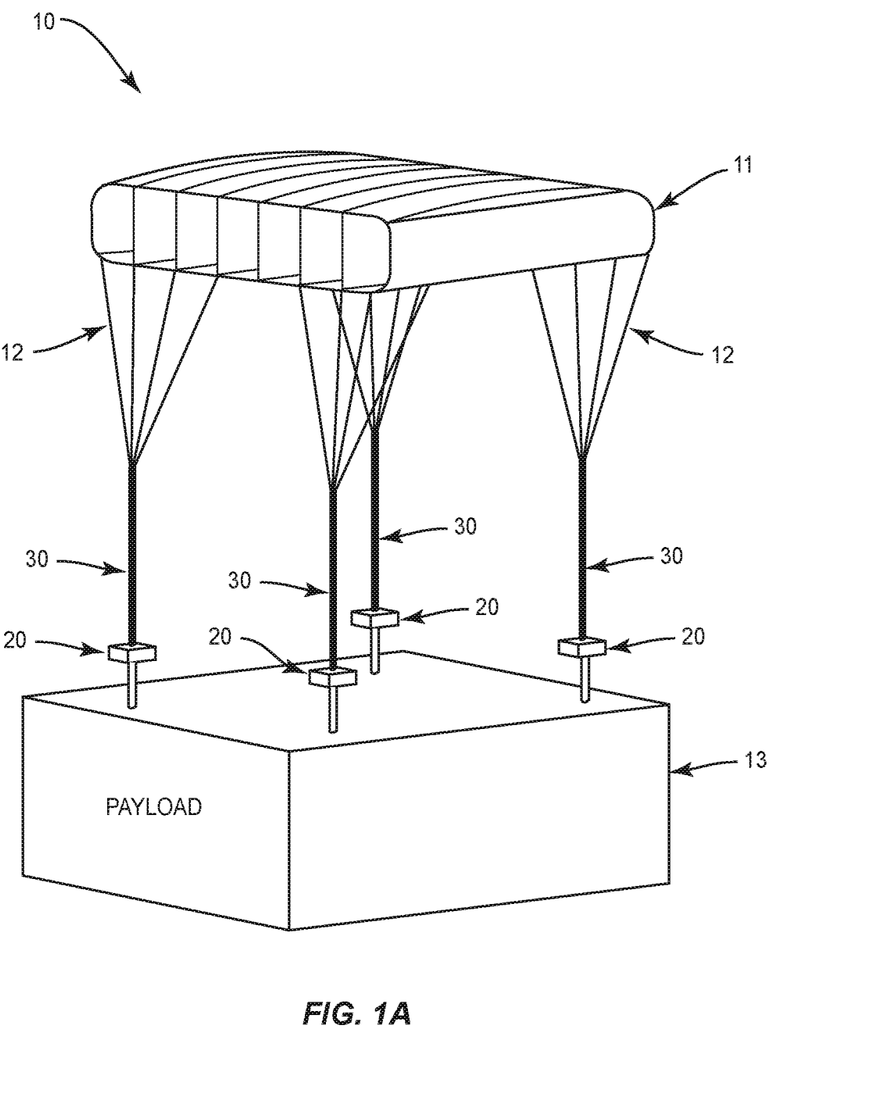
FIG. 1A is a schematic view of a device to orient risers on a parachute that includes twist bodies.
Figure 1B:
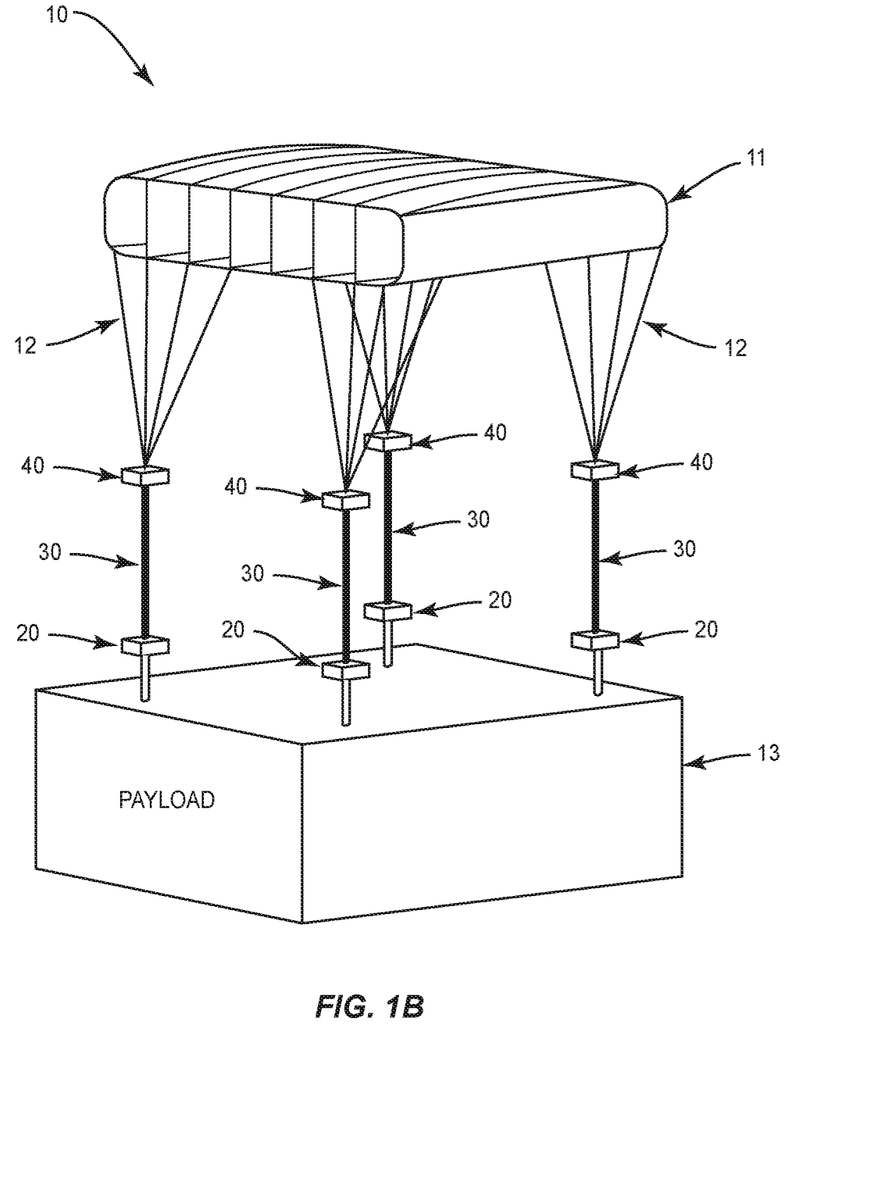
FIG. 1B is a schematic view of a device to orient risers on a parachute that includes twist bodies and links.

FIGS. 1A and 1B schematically illustrate deployed parachutes 10 that include a canopy 11 with suspension lines 12. A harness 13 is configured to be attached to payload as illustrated in FIGS. 1A and 1B, or worn by the user (see FIG. 2). Risers 30 extend from the harness 13. FIG. 1A includes a device with twist bodies 20 positioned along one or more of the risers 30. The twist bodies 20 orient sections of the risers 30. FIG. 1B includes a device with twist bodies 20 and also links 40 that connect the risers 30 to the suspension lines 12. The twist bodies 20 orient the risers 30, and the links 40 facilitate attachment of the risers 30 in the desired orientation to the suspension lines 12.

Figure 2:
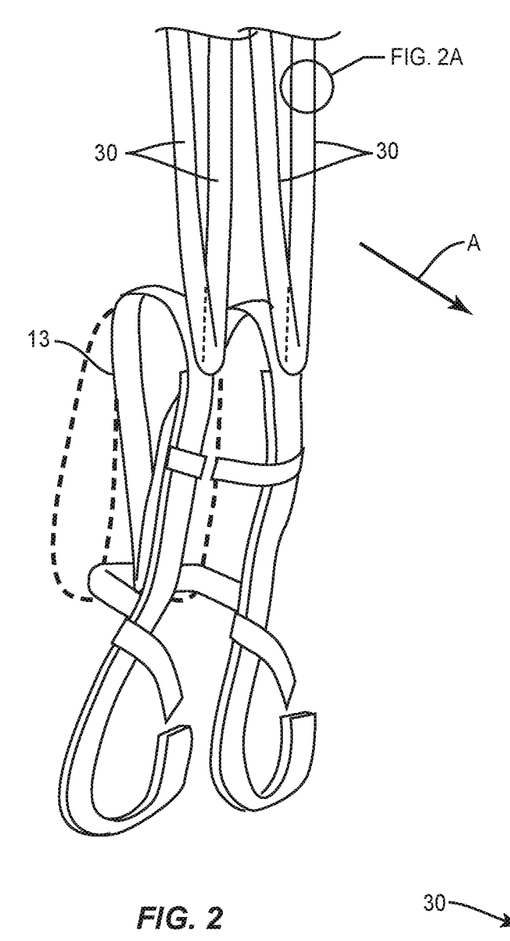
FIG. 2 is a schematic perspective view of a harness with risers.
Figure 2A:
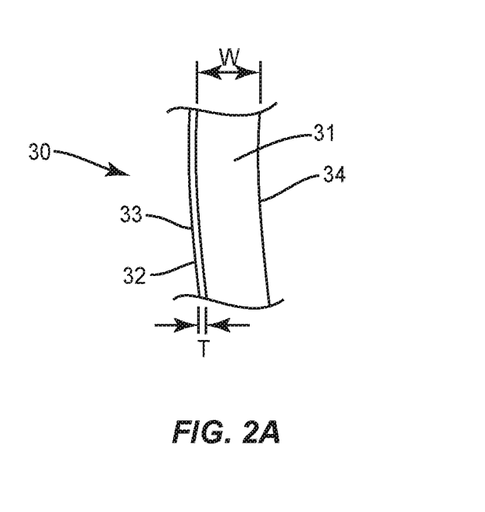
FIG. 2A is a perspective view of a section of a riser.

The risers 30 extend from the harness 13 as illustrated in FIG. 2. Front risers 30 extend upward and connect to the suspension lines 12 along the front of the canopy 11. The back risers 30 extend and connect to the suspension lines 12 along the rear of the canopy 11. As illustrated in FIG. 2A, the risers 30 are constructed from a flexible webbing material that includes first and second sides 31, 32 that extend between opposing edges 33, 34. The risers 30 include a width W measured between the edges 33, 34. The risers 30 also include a thickness T measured between the first and second sides 31, 32. The width W of the risers 30 is considerably larger than the thickness T.

When the parachute 10 has a direction of travel as illustrated by arrow A in FIG. 2, the wide first sides 31 of the risers 30 are exposed to relative wind and produce drag on the parachute 10. To lessen the drag, the twist bodies 20 orient the upper sections of the risers 30 such that one of the edges 33, 34 faces in the direction of travel. This re-orientation lessens the amount of drag caused by the risers 30.

Twist bodies 20 are positioned along one or more of the risers 30 to change the orientation of the risers 30. Each twist body 20 can realign the section of the riser 30 between the twist body 20 and the link 40 such that one of the edges 33, 34 is oriented in a forward direction. This re-orientation reduces the air drag caused by the riser 30 during the descent.

Figure 3A:
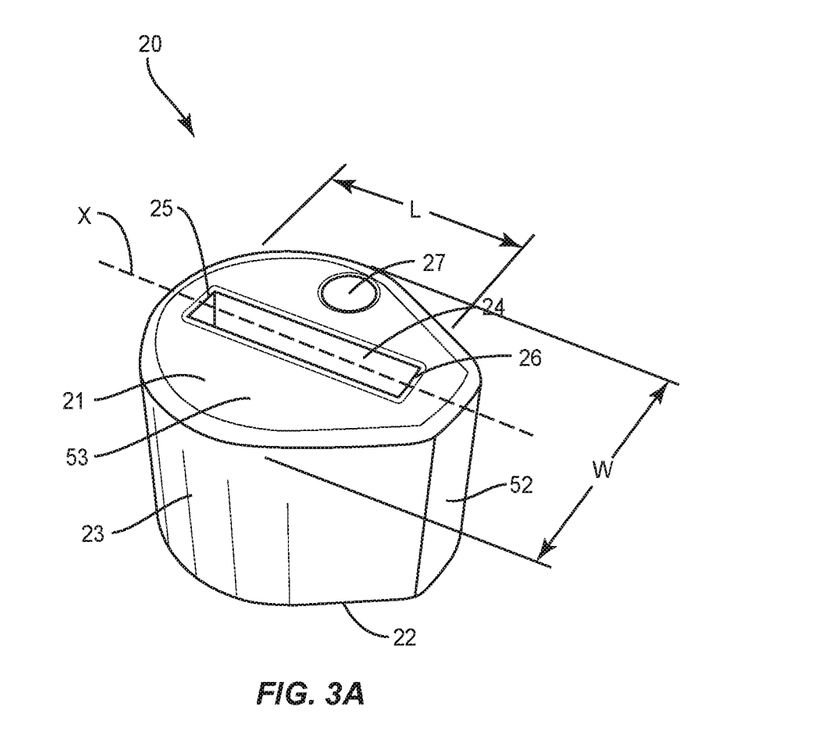
FIG. 3A is a perspective view of a first side of a twist body.
Figure 3B:
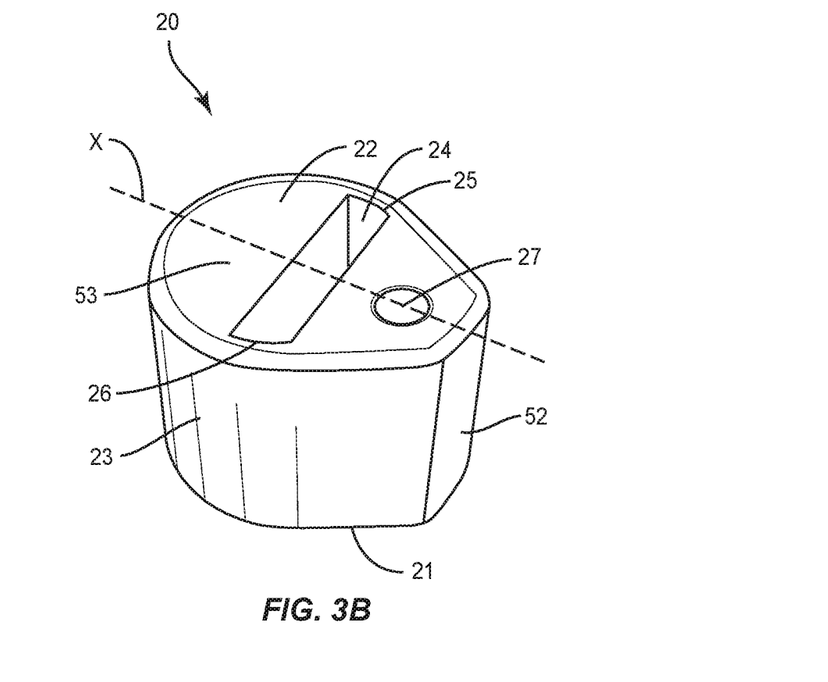
FIG. 3B is a perspective view of a second side of a twist body.

FIGS. 3A and 3B illustrate a twist body 20 that includes opposing first and second sides 21, 22. FIG. 3A illustrates the twist body 20 oriented with the first side 21 facing upwards. FIG. 3B illustrates the twist body 20 oriented with the second side 22 facing upwards. The twist body 20 includes an outer sidewall 23 that extends between the first and second sides 21, 22. A slot 24 extends through the twist body 20 and is contained within the sidewall 23. The slot 24 includes a length L measured along a major axis between opposing first and second ends 25, 26. The slot 24 is sized to receive the riser 30 and the length L is greater than or equal to the width W of the riser 30. The twist body 20 can include a tapered shape with an enlarged central section 53 that narrows to a first end 52. The first end 52 can include a smaller width W than the central section 53. In one design, the first end 52 faces away from the direction of travel during use.

The slot 24 includes a twisted shape as it extends through the twist body 20 between the first and second sides 21 22. The twist orients an opening at a first side 21 of the twist body 20 at a transverse angle relative to an opening at a second side 22 of the twist body 20. In one design as illustrated in FIGS. 3A and 3B, the slot 24 includes a twist of 90°. The major axis of an opening of the slot 24 at a first side 21 of the twist body 20 is offset by 90° relative to the major axis of the opening of the slot 24 at the second side 22 of the twist body 20. As illustrated in FIG. 3A, the opening of the slot 24 on the first side 21 is aligned along a centerline X of the twist body 20. As illustrated in FIG. 3B, the opening of the slot 24 on the second side 22 is perpendicular to the centerline X. The extent of the twist controls the re-orientation of the riser 30. One design includes a twist of 90°. Other designs can include a twist of between to 180°.

The twist body 20 can also include a hole 27 for a cable to extend. The hole 27 extends through the twist body 20 and includes openings on each of the first and second sides 21, 22. The hole 27 includes a twist that corresponds to that of the slot 24 such that the position of the hole 27 relative to the slot 24 remains the same. In the embodiment of FIGS. 3A and 3B, the hole 27 remains positioned on one side of the slot 24 and at the middle of the slot 24. The hole 27 can be at a constant distance from the slot 24 throughout the twist body 20 as each extends between the first and second sides 21, 22. The hole 27 can also be positioned at other locations relative to the slot 24, including but not limited to the opposing side of the slot 24, and in closer proximity to one of the ends 25, 26. The hole 27 can include a smaller sectional size than the slot 24.

Figure 4:
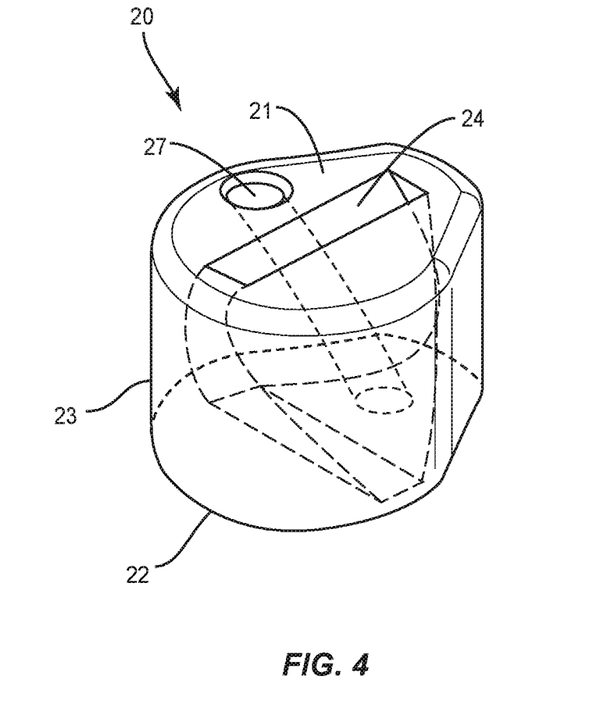
FIG. 4 is a schematic perspective view of a twist body that includes a twisted slot and hole.

FIG. 4 illustrates a twist body 20 with a twisted slot 24 and a hole 27. The hole 27 follows the slot 24 through a twist of 90 degrees. The slot 24 and the hole 27 remain in a common relative relationship through the thickness of the twist body 20 between the first side 21 and the second side 22. The slot 24 can include a width and a length that are constant throughout the twist body 20 between the first and second sides 21, 22.

Figure 5:
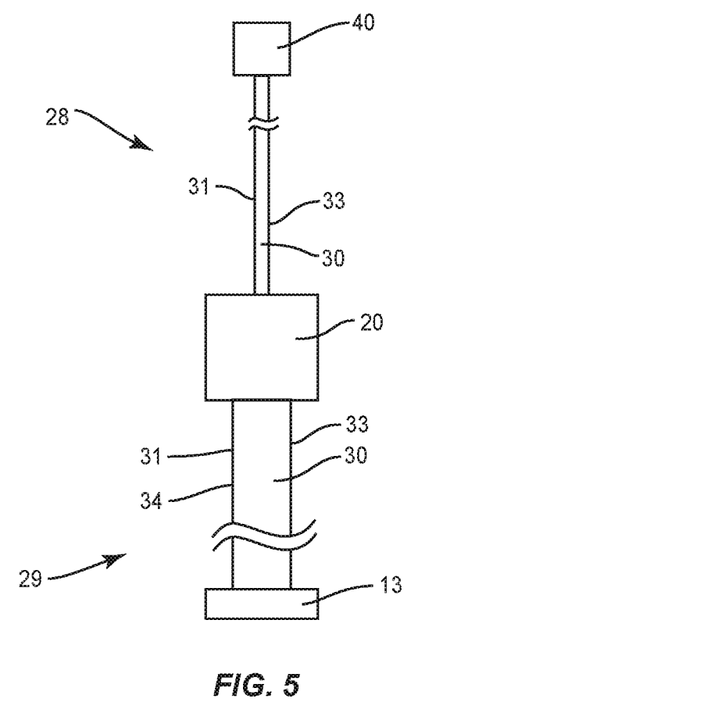
FIG. 5 is a schematic front view of a twist body positioned along a riser.

As illustrated in FIG. 5, the twist body 20 re-orients a first section 28 of the riser 30 between the twist body 20 and the link 40. A second section 29 of the riser 30 between the harness 13 and the twist body 20 remains in a high profile orientation. The first section 28 includes a low profile orientation as one of the edges 33, 34 faces in the direction of travel. The width of the first section 28 is smaller than the width of a second section 29 thus reducing the amount of drag. The smaller width is a result of the leading edge of the first section 28 being smaller than that of the second section 29.

Figure 6A:
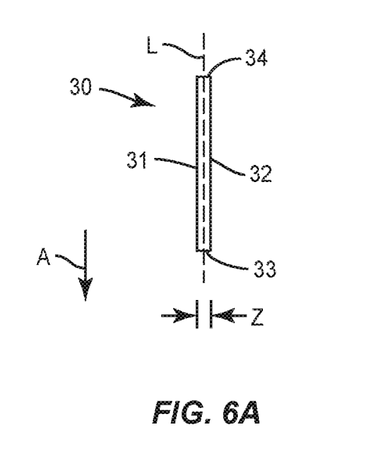
FIG. 6A is a schematic view of a riser.
Figure 6B:
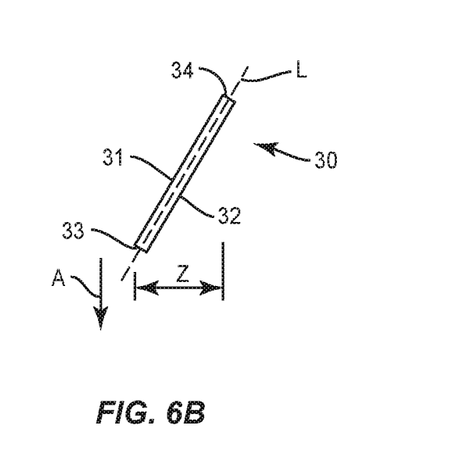
FIG. 6B is a schematic view of a riser.

The twist body 20 can orient the riser 30 to a low profile to reduce the drag. As illustrated in FIG. 6A, the riser 30 can be oriented such that a longitudinal axis L of the riser 30 is parallel with the direction of travel A. This orientation positions one of the edges 33, 34 directly forward and provides for the riser 30 to have an effective width Z that is equal to the leading edge 33. As illustrated in FIG. 6B, the twist body 20 can also orient the riser 30 such that the longitudinal axis L is not parallel with the direction of travel A (i.e., one of the edges 33, 34 does not face directly forward). This orientation provides for the effective width Z to still be smaller than if the riser 30 were perpendicular to the direction of travel which can occur along the second section 29 (e.g., FIG. 5).

Figure 7:
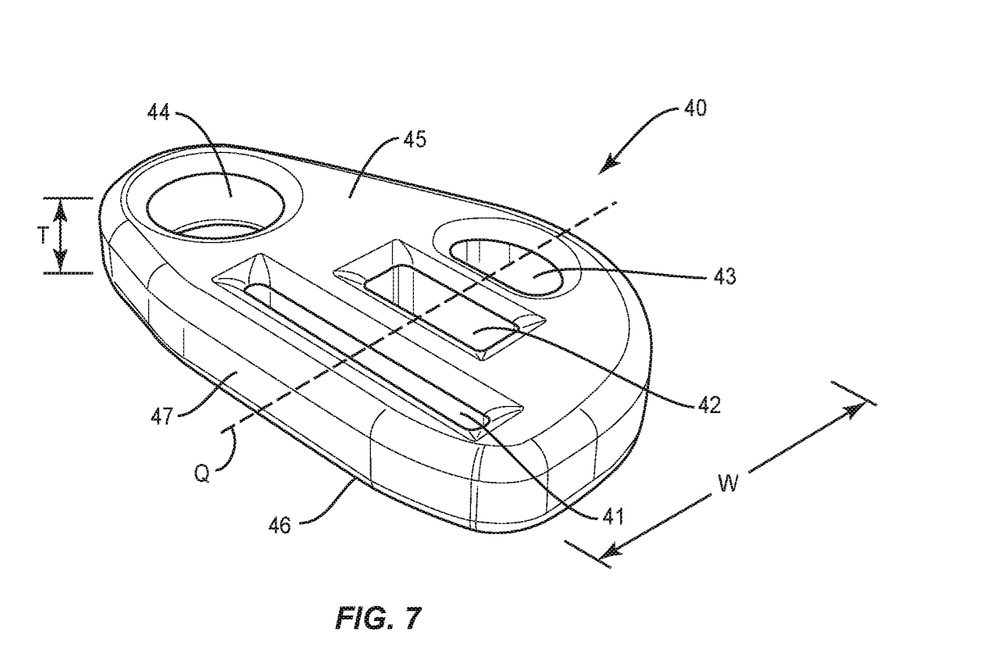
FIG. 7 is a perspective view of a link.
Figure 12:
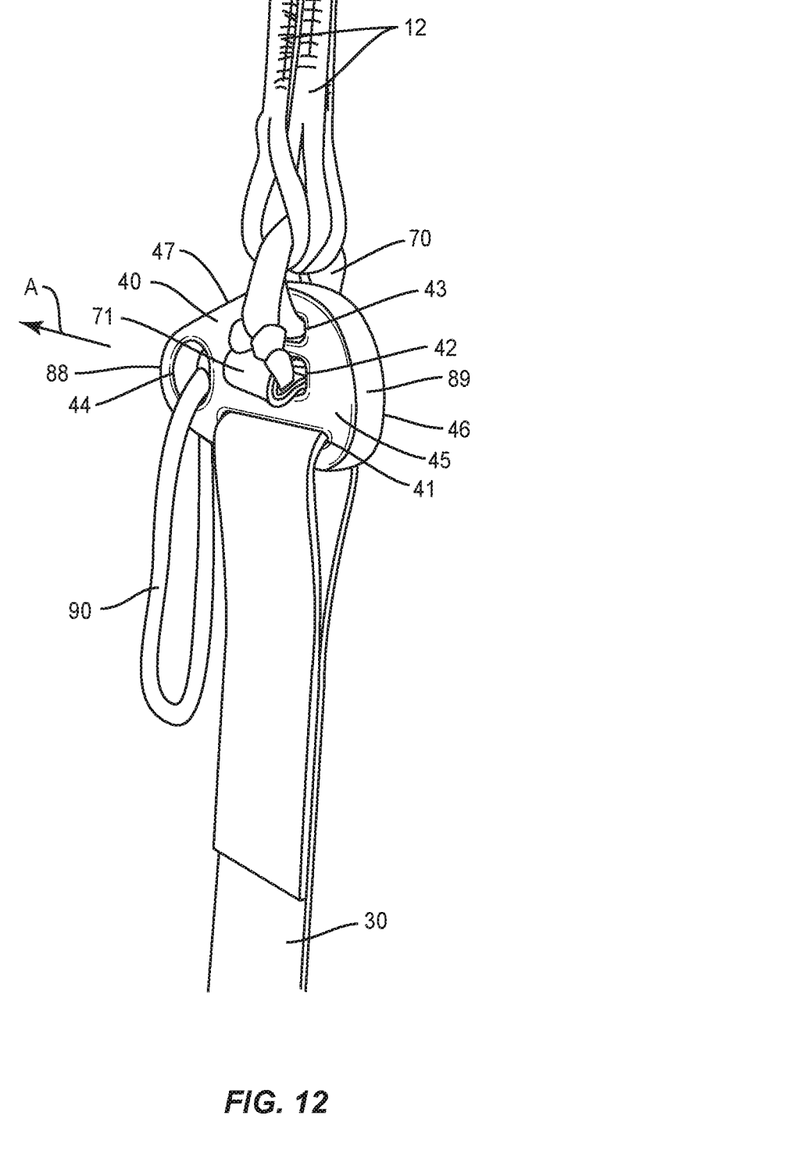
FIG. 12 is a perspective view of a link attached to a riser, a connector with suspension lines, and an input device.

The links 40 secure the risers 30 to the suspension lines 12. FIG. 7 includes a link 40 configured to attach a riser 30 that is in a low-profile orientation to the suspension lines 12 in a side-by-side configuration. This link 40 can be used to secure the front risers 30 to the corresponding suspension lines 12. The link 40 includes a slot 41 with an elongated shape configured to receive the riser 30. Holes 42, 43 are configured to secure the link 40 to the suspension lines 12 as illustrated in FIG. 12. One configuration includes the holes 42, 43 sized to receive a connector 70, such as a soft link (Slink), to secure the suspension lines 12. One configuration of the connector 70 is a PD main canopy single slink available from Performance Designs of Deland, Fla., United States. The link 40 can also include a separate hole 44 to secure an input device 90 such as an input loop (see FIG. 12) for the user to control the flight of the parachute 10.

The slot 41 can have a rectangular sectional shape to receive the riser 30. The hole 42 can have a rectangular sectional shape to receive the connector 70. The slot 41 and hole 42 can include corners. The hole 43 can include a non-rectangular sectional shape.

The links 40 can include a flattened shape with opposing first and second sides 45, 46. The sides 45, 46 can be flat with rounded edges at the sidewalls 47. A thickness T of the links 40 is measured between the first and second sides 45, 46. The flattened shape of the links 40 includes the thickness T being less than the width W measured between opposing sidewalls 47. A straight line Q extends through a midpoint of each of the slot 41 and openings 42, 43. The line Q can be positioned on the link 40 at a point having the largest width W.

The links 40 are configured to be positioned in a low-profile orientation during use as illustrated in FIG. 12. The slot 41 with the attached riser 30 is positioned downward below the holes 42, 43 that receive the connector 70. The connector 70 extends through hole 43 and connects to the suspension lines 12 at a point above the link 40. A tail 71 of the soft link 70 is positioned in the hole 42. The shape of the hole 42 can include a rectangular cross-section that matches the shape of the tail 71. The corresponding shapes provide for the tail 71 to be secured in the link 40 and prevent movement during use of the parachute 10.

The link 40 is configured to maintain the riser 30 in the low profile orientation relative to the direction of travel A. FIG. 12 includes a link 40 being used with a parachute with a direction of travel A. The link is oriented with the narrow sidewall 47 facing in the direction of travel. This reduces the drag on the parachute 10. The wider first and second sides 45, 46 are oriented transverse to the direction of travel A. The link 40 connects the riser 30 to the suspension lines 12 while maintaining the riser 30 in the low-profile orientation. As further illustrated, the hole 44 is positioned to receive an input device 90 such as an input loop.

In one design as illustrated in FIG. 12, the link 40 is aligned with end 88 facing in the direction of travel A. The end 88 is in proximity to the input device 90 and the hole 40. In another design (not illustrated), the link 40 is oriented with the end 89 facing in the direction of travel A. The hole 40 with the input device 90 is positioned at a rear of the link 40.

Figure 8:
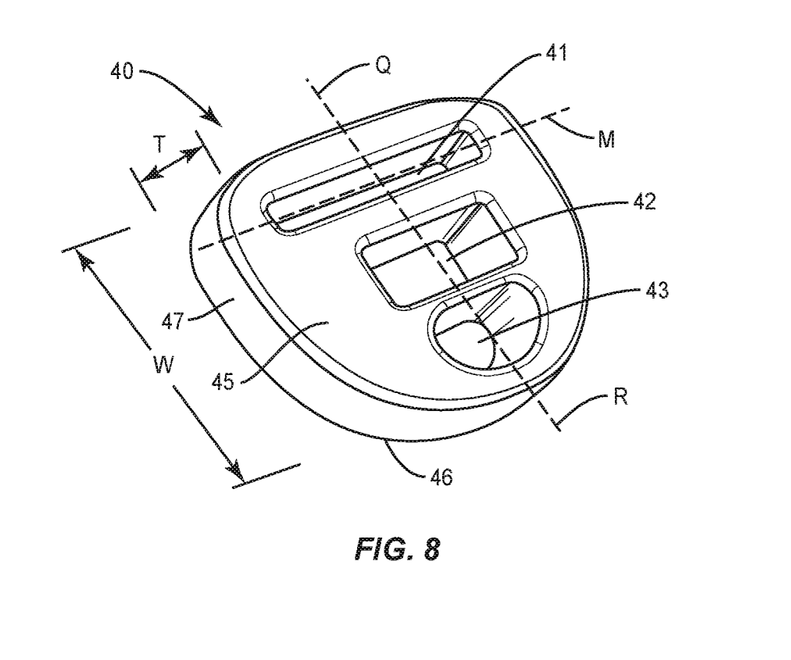
FIG. 8 is a perspective view of a link.

FIG. 8 illustrates another link 40 to secure a riser 30 to the suspension lines 12. The link 40 includes a slot 41 to receive the riser 30. Holes 42, 43 are configured to secure the link 40 to the suspension lines 12. One configuration includes the holes 42, 43 configured to receive a connector 70, such as a soft link (Slink), to secure the suspension lines 12 (see FIG. 12). In one design, the link 40 of FIG. 8 is used to secure the rear risers 30 and the link 40 of FIG. 7 is used to secure the front risers 40.

In one design as illustrated in FIG. 8, the slot 41 includes a major axis M. The link 40 comprises a centerline R. The major axis M is perpendicular to the centerline R. Further, the line Q that extends through the midpoint of the slot 41 and holes 42, 43 can be located on the link 40 at the largest width.

Figure 9:
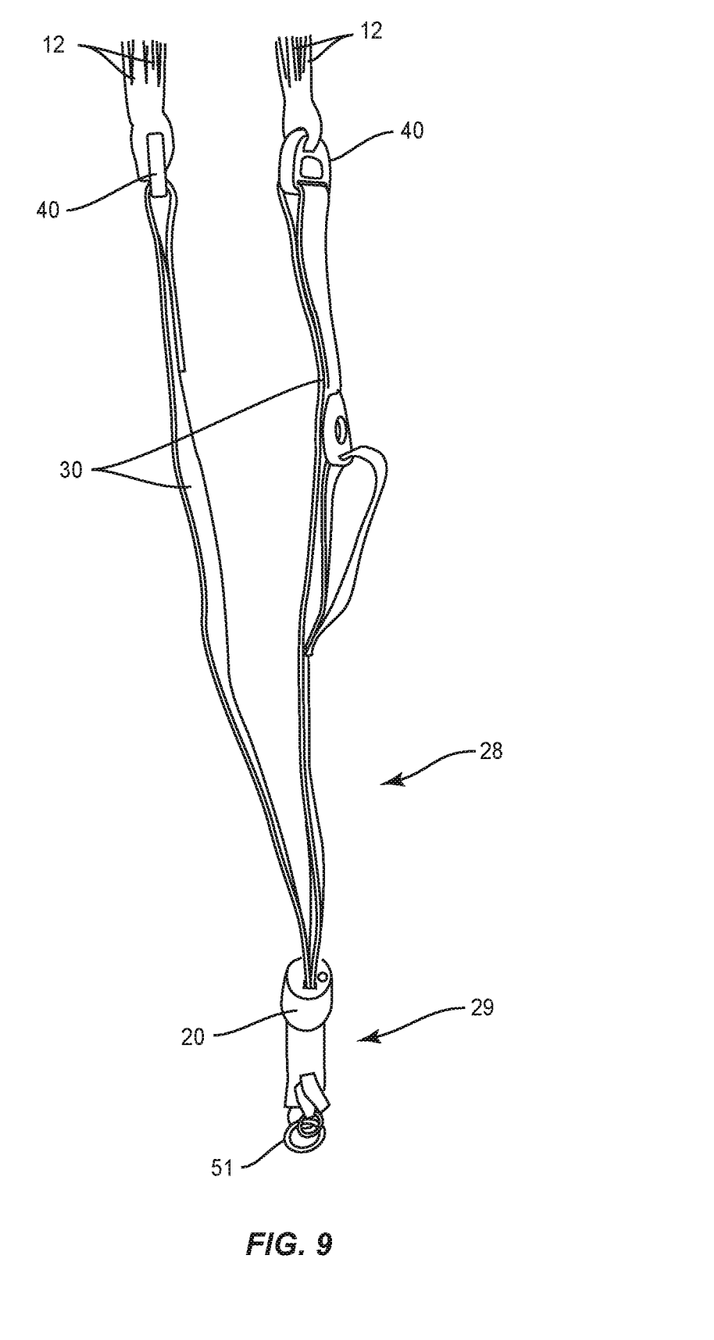
FIG. 9 is a perspective view of a twist body position along risers and with links at the upper ends of each of the risers.
Figure 10:
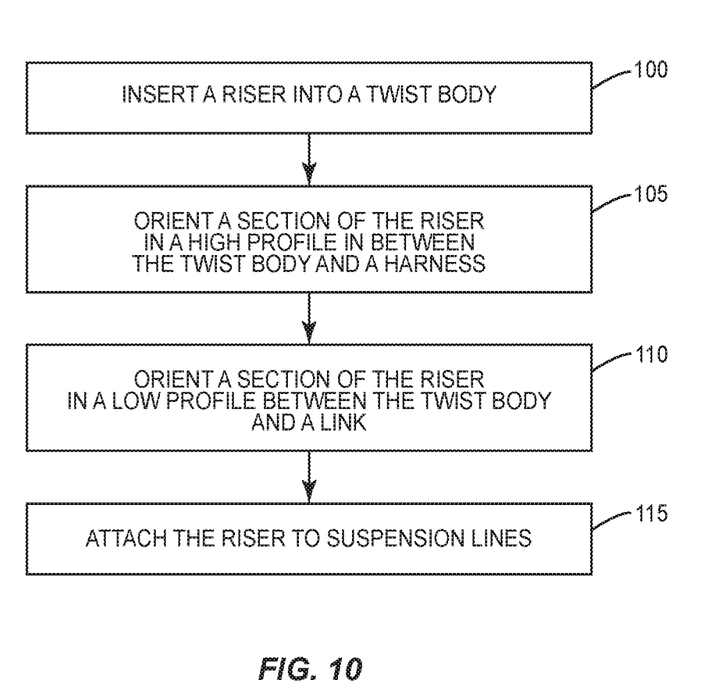
FIG. 10 is a flowchart diagram of a method of orienting a riser of a parachute.

FIG. 9 illustrates a device to orient risers 30. A twist body 20 is positioned along the risers 30. The twist body 20 changes the orientation of the risers 30 between the first section 28 that extends to the links 40 and a second section 29 that is configured through a ring assembly 51 to be connected to a harness 13 (not illustrated in FIG. 9). The twist body 20 is positioned in proximity to the end of the risers 30 that attaches to the harness 13. This provides for a longer first section 28 and shorter second section 29 thus reducing drag over a longer length of the risers 30. The links 40 are secured to the ends of each of the risers 30 to maintain the first sections 28 in the low profile orientation, FIG. 10 illustrates a method of orienting risers of a parachute. The method includes inserting a riser 30 through a twist body 20 (block 100). The riser 30 includes a first orientation between a harness 13 and the twist body 20 with a high profile in a direction of travel (block 105). The riser 30 also includes a second orientation between the twist body 20 and a link 40 with a low profile in the direction of travel (block 110). The riser 30 is attached to suspension lines 12 that extends from a canopy 11 of the parachute 10 (block 115). A link 30 can be used to attach the riser 30 to the suspension lines 12.

Another method is directed to attaching a riser 30 to suspension lines 12. The method includes attaching the riser 30 in a slot 41 in a link 40 with the riser 30 extending outward from a bottom of the link 40 and with each of the riser 30 and the link 40 being in low profile orientation with narrow leading edges facing into a direction of travel and wide sides facing transverse to the direction of travel. A connector 70 is attached to a first hole 43 in the link 40 with the connector 70 positioned at a top of the link 40. The connector 70 is secured to the suspension lines 12 of the parachute 10. The tail of the connector 70 can be inserted in a second hole 42 in the link 40.

One design includes a twist body 20 positioned along each riser 30. Other designs can include twist bodies 20 positioned along a limited number of the risers 30. In designs with multiple twist bodies 20, the slots 24 can include the same or different amounts of twist. One design includes each of the twist bodies 20 being the same with the same amount of twist in the slots 24.

The twist body 20 can be used with a variety of different links 40. Other links 40 include but are not limited to various hard and soft link configurations.

The parachute 10 can be used in a variety of different contexts, including with a person as illustrated in FIG. 2 and with objects as illustrated in FIG. 1.

Figure 11:
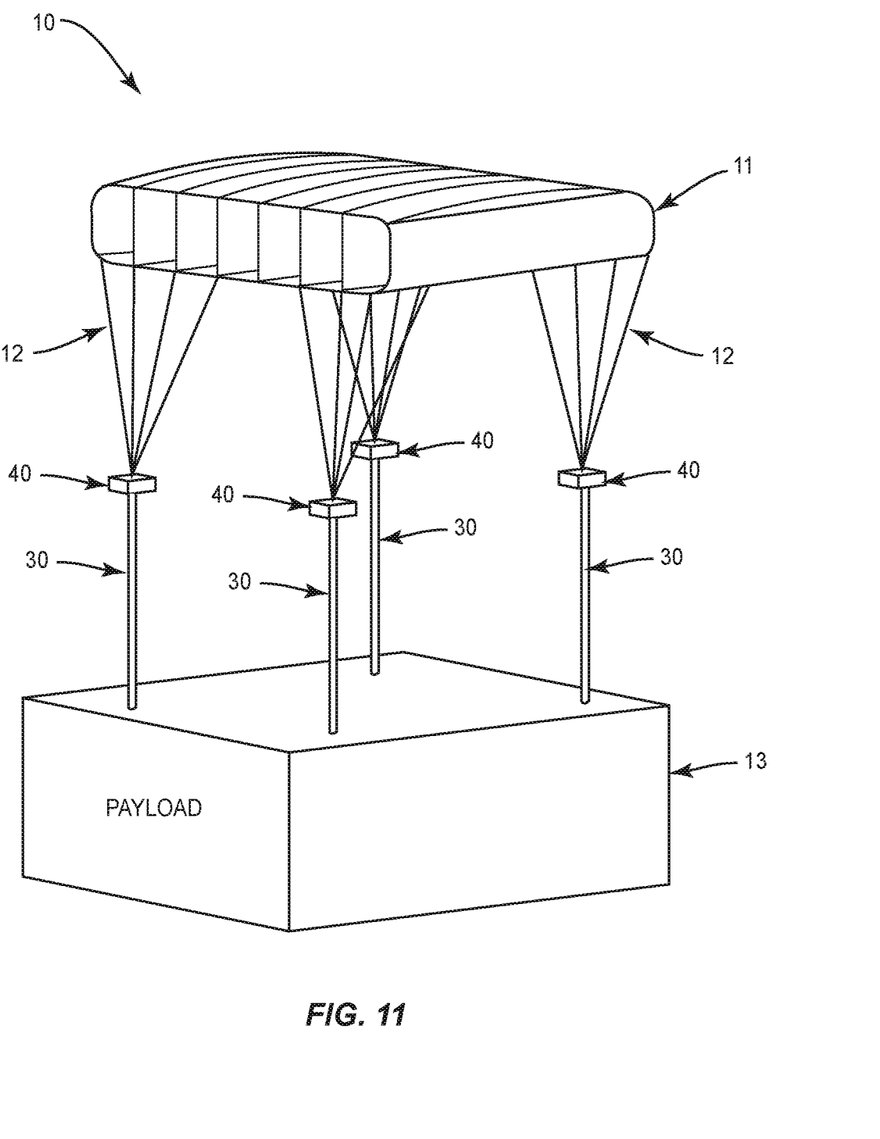
FIG. 11 is a schematic side view of a device to orient risers on a parachute that includes links.

Another design includes a device with just a link 40 positioned along one or more of the risers 30. As illustrated in FIG. 11 the links 40 provide for connecting the risers 30 that are in a particular orientation to the suspension lines 12. The orientation of the risers 30 can be adjusted by the connection with the harness 13, the payload, or some other means. The links 40 can be positioned along one or more of the risers 30, including along each of the risers 30 as illustrated in FIG. 11. The links 40 can include those as illustrated in FIG. 7, those in FIG. 8, and a combination of different links 40.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A device for use with a parachute, the device comprising:
   a riser with an elongated shape with a first end and a second end;
   a twist body that receives and orients the riser, the twist body comprising:
      a first side that faces towards the first end of the riser and an opposing second side that faces towards the second end of the riser;
      a slot with an elongated shape that extends through the twist body and is sized to receive the riser, the slot comprises a first opening at the first side and a second opening at the second side, the slot including a twist with the first opening being transverse to the second opening.

2. The device of claim 1, further comprising a link configured to be positioned at the second end of the riser and spaced away from the twist body, the link comprising at least a first hole to receive the riser and a second hole that is spaced away from the first hole.

3. The device of claim 1, wherein the twist of the slot is 90 degrees.

4. The device of claim 3, wherein the slot comprises a major axis and the major axis at the first opening is perpendicular to the major axis at the second opening.

5. The device of claim 1, wherein the twist of the slot is between 5 degrees and 180 degrees between the first and second sides of the twist body.

6. The device of claim 1, wherein the twist of the slot is constant between the first and second sides of the twist body.

7. The device of claim 1, further comprising a twisted hole that extends through the twist body between the first and second sides, a sectional area of the hole being smaller than the slot and with the hole being spaced away from the slot.

8. The device of claim 7, wherein the hole is positioned a constant distance away from the slot throughout the twist body between the first and second sides.

9. The device of claim 7, wherein at least one of the slot and the hole are contained within a sidewall of the twist body.

10. A device for use with a parachute, the device comprising:
    risers comprising an elongated shape each with a first end and a second end;
    twist bodies positioned along the risers, each of the twist bodies comprising opposing first and second sides and a slot that receives one of the risers and with a twist between the first and second sides of between 5 degrees and 180 degrees; and
    the twist of each of the twist bodies configured to orient a first section of the riser between the twist body and the first end in a high profile position and a second section of the riser between the twist body and the second end in a low profile position.

11. The device of claim 10, further comprising links configured to attach the risers to suspension lines of the parachute, each of the links comprising a first hole to receive one of the risers and a second hole to receive one or more of the suspension lines of the parachute.

12. The device of claim 10, wherein the twist of each of the twist bodies is equal.

13. The device of claim 10, wherein the twist of each of the twist bodies is 90 degrees.

14. The device of claim 10, wherein the slot of each of the twist bodies comprises a major axis with the major axis at the first side of the twist body being perpendicular to the major axis at the second side of the twist body.

15. The device of claim 10, wherein each of the twist bodies further comprises a twisted hole that extends through the twist body between the first and second sides, a sectional area of the hole being smaller than the slot and with the hole being spaced away from the slot by a constant distance throughout the twist body.

16. A method of orienting a riser of a parachute, the method comprising:
    inserting a riser through a slot in a twist body such that the riser has a first orientation on a first side of the twist body with a high profile in a direction of travel and a second orientation on a second side of the twist body with a low profile in the direction of travel.

17. The method of claim 16, further comprising attaching the riser to a link and securing the riser to suspension lines of the parachute.

18. The method of claim 16, further comprising rotating the riser 90 degrees within the twist body.

19. The method of claim 16, further comprising inserting a cable through a hole in the twist body.

20. The method of claim 17, further comprising orienting a first section of the riser that extends between the twist body and the link with a narrow edge of the riser facing in the direction of travel and orientating a second section of the riser that extends between the twist body and a harness with a wide side of the riser facing in the direction of travel.

* * * * *